US012773962B2

(12) United States Patent
Aso

(10) Patent No.: US 12,773,962 B2
(45) Date of Patent: Oct. 27, 2026

(54) VEHICLE FRONT PORTION STRUCTURE

(71) Applicant: TOYOTA JIDOSHA KABUSHIKI KAISHA, Toyota (JP)

(72) Inventor: Shuichi Aso, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 176 days.

(21) Appl. No.: 18/932,642

(22) Filed: Oct. 31, 2024

(65) Prior Publication Data

US 2025/0170976 A1 May 29, 2025

(30) Foreign Application Priority Data

Nov. 24, 2023 (JP) ................................ 2023-199406

(51) Int. Cl.
*B60R 19/18* (2006.01)
*B60R 19/48* (2006.01)
*B60R 19/52* (2006.01)

(52) U.S. Cl.
CPC ...... *B60R 19/18* (2013.01); *B60R 2019/1866* (2013.01); *B60R 2019/1886* (2013.01); *B60R 19/48* (2013.01); *B60R 2019/486* (2013.01); *B60R 2019/527* (2013.01)

(58) Field of Classification Search
CPC ............ B60R 19/18; B60R 2019/1886; B60R 2019/527; B60R 19/00; B60R 19/023; B60R 2019/186; B60R 2019/1873; B60R 19/48; B60R 19/483; B60R 2019/486; B60Q 5/00
USPC ................................ 293/102, 117, 120, 121
See application file for complete search history.

(56) References Cited

U.S. PATENT DOCUMENTS 7,497,491 B2 * 3/2009 Zanella .................... B60Q 5/00 293/102
2005/0046206 A1 * 3/2005 Ohno ...................... B60R 19/18 293/120
2017/0050509 A1 * 2/2017 Aizawa ................ B60K 11/085
2019/0270376 A1 * 9/2019 Sedlak ................. B60K 11/085
2021/0237673 A1 * 8/2021 Tokuyama .............. B60R 19/52
(Continued)

FOREIGN PATENT DOCUMENTS

JP 2009-166803 A 7/2009
JP 6182596 B2 * 8/2017 ............... B60Q 5/00
JP 2019-069660 A 5/2019

OTHER PUBLICATIONS

WO 2014162475 and computer translation (Year: 2014).*
JP 2025135775 (Year: 2025).*

*Primary Examiner* — Gregory A Blankenship
(74) *Attorney, Agent, or Firm* — SOLARIS Intellectual Property Group, PLLC

(57) ABSTRACT

A vehicle front portion structure includes: a bumper reinforcement that extends substantially in a vehicle width direction at a front portion of a vehicle; an absorber that is provided at a vehicle front side of the bumper reinforcement, and that includes a notch portion forming, together with a front wall of the bumper reinforcement, a through hole that penetrates in a vehicle vertical direction; a lower grille that is provided at a bumper cover at a vehicle lower side of the absorber, as seen in front view; and a horn that is supported at an upper wall of the bumper reinforcement, and that is disposed such that a resonance portion faces the through hole from a vehicle upper side.

8 Claims, 6 Drawing Sheets

(56) References Cited

U.S. PATENT DOCUMENTS

| | | | | |
|---|---|---|---|---|
| 2022/0024521 | A1* | 1/2022 | Tokuyama | B60R 19/52 |
| 2022/0063529 | A1* | 3/2022 | Wright | B60R 19/023 |
| 2023/0095260 | A1* | 3/2023 | Tanaka | B60R 19/48<br>381/86 |
| 2024/0317164 | A1* | 9/2024 | Aso | B60Q 5/00 |
| 2025/0170976 | A1* | 5/2025 | Aso | B60R 19/18 |

* cited by examiner

VEHICLE FRONT PORTION STRUCTURE

CROSS-REFERENCE TO RELATED APPLICATION

This application is based on and claims priority under 35 USC 119 from Japanese Patent Application No. 2023-199406, filed on Nov. 24, 2023, the entire disclosure of which is incorporated by reference herein.

BACKGROUND

Technical Field

The present disclosure relates to a vehicle front portion structure.

Related Art

Structures in which a first horn and a second horn are disposed directly under a bumper reinforcement in order to ensure sound pressure performance of the horn (to suppress a sound pressure drop) are conventionally known (see, for example, Japanese Patent Application Laid-Open (JP-A) No. 2009-166803).

However, with such a configuration, there is a risk that the horn may fail due to road surface interference, entry of foreign matter such as muddy water, or the like.

SUMMARY

In this regard, the present disclosure provides a vehicle front portion structure that is capable of suppressing a sound pressure drop of sound generated from a horn, and that is capable of suppressing the occurrence of a failure in the horn.

A vehicle front portion structure according to a first aspect of the present disclosure includes: a bumper reinforcement that extends substantially in a vehicle width direction at a front portion of a vehicle; an absorber that is provided at a vehicle front side of the bumper reinforcement, and that includes a notch portion forming, together with a front wall of the bumper reinforcement, a through hole that penetrates in a vehicle vertical direction; a lower grille that is provided at a bumper cover at a vehicle lower side of the absorber, as seen in front view; and a horn that is supported at an upper wall of the bumper reinforcement, and that is disposed such that a resonance portion faces the through hole from a vehicle upper side.

In the first aspect, an absorber provided at a vehicle front side of a bumper reinforcement includes a notch portion that forms, together with a front wall of the bumper reinforcement, a through hole that penetrates in a vehicle vertical direction. A lower grille is provided at a bumper cover at a vehicle lower side of the absorber, as seen in front view, and a horn that is supported at an upper wall of the bumper reinforcement is disposed such that a resonance portion faces the through hole from a vehicle upper side.

Namely, sound generated from the horn is transmitted from the lower grille toward the vehicle front side through the through-hole. Therefore, a sound pressure drop of sound generated from the horn is suppressed. Further, as a result of the horn being supported at the upper wall of the bumper reinforcement, there is no risk of a failure due to road surface interference, entry of foreign matter such as muddy water, or the like. This also suppresses an occurrence of a failure in the horn.

A vehicle front portion structure according to a second aspect of the present disclosure includes: a bumper reinforcement that extends substantially in a vehicle width direction at a front portion of a vehicle; an absorber that is provided at a vehicle front side of the bumper reinforcement, and that includes a notch portion forming, together with a bumper cover, a through hole that penetrates in a vehicle vertical direction; a lower grille that is provided at the bumper cover at a vehicle lower side of the absorber, as seen in front view; and a horn that is supported at an upper wall of the bumper reinforcement, and that is disposed such that a resonance portion faces the through hole from a vehicle upper side.

In the second aspect, an absorber provided at a vehicle front side of a bumper reinforcement includes a notch portion that forms, together with a bumper cover, a through hole that penetrates in a vehicle vertical direction. A lower grille is provided at the bumper cover at a vehicle lower side of the absorber, as seen in front view, and a horn that is supported at an upper wall of the bumper reinforcement is disposed such that a resonance portion faces the through hole from a vehicle upper side.

Namely, sound generated from the horn is transmitted from the lower grille toward the vehicle front side through the through-hole. Therefore, a sound pressure drop of sound generated from the horn is suppressed. Further, as a result of the horn being supported at the upper wall of the bumper reinforcement, there is no risk of a failure due to road surface interference, entry of foreign matter such as muddy water, or the like. This also suppresses an occurrence of a failure in the horn.

A vehicle front portion structure according to a third aspect of the present disclosure is the vehicle front portion structure according to the first aspect or the second aspect, wherein the horn is supported at the upper wall of the bumper reinforcement so as to be movable toward a vehicle rear side when a load is input from the vehicle front side.

In the third aspect, the horn is supported at the upper wall of the bumper reinforcement so as to be movable toward the vehicle rear side when a load is input from the vehicle front side. Therefore, energy absorption by the absorber is not likely to be hindered by the horn during a frontal collision of the vehicle.

A vehicle front portion structure according to a fourth aspect of the present disclosure is the vehicle front portion structure according to the third aspect, wherein: the bumper reinforcement includes a shield plate, which prevents movement of the horn toward the vehicle rear side at normal times, at the upper wall thereof; and the horn is configured to pierce the shield plate when a load is input from the vehicle front side, and move toward the vehicle rear side. [claim 4]

In the fourth aspect, a shield plate, which prevents movement of the horn toward the vehicle rear side at normal times, is provided at the upper wall of the bumper reinforcement. When a load is input from the vehicle front side, the horn pierces the shield plate and moves toward the vehicle rear side. This enables the horn to be moved toward the vehicle rear side with a simple configuration when a load is input from the vehicle front side.

A vehicle front portion structure according to a fifth aspect of the present disclosure is the vehicle front portion structure according to any one of the first aspect to the fourth aspect, wherein: plural notch portions, each forming a through hole, are separated from each other in the vehicle width direction; and horns are respectively provided at each through hole.

In the fifth aspect, plural notch portions, each forming a through hole, are separated from each other in the vehicle width direction, and horns are respectively provided at each through hole. This enables a sound pressure drop of sound transmitted from the lower grille toward the vehicle front side to be suppressed compared to a case in which only a single horn is provided.

As described above, the present disclosure enables a sound pressure drop of sound generated from a horn to be suppressed, and enables an occurrence of a failure in the horn to be suppressed.

DETAILED DESCRIPTION

Detailed explanation follows regarding exemplary embodiments according to the present disclosure, based on the drawings. It should be noted that for convenience of explanation, in each of the drawings, as appropriate, the arrow UP indicates a vehicle upper direction, the arrow FR indicates a vehicle front direction, and the arrow RH indicates a vehicle right direction. Therefore, in the following explanation, unless specifically stated otherwise, in a case in which up-down (vertical), front-rear, and left-right directions are described, these refer to up and down in a vehicle vertical direction, the front and rear in a vehicle front-rear direction, and the left and right in a vehicle left-right direction (vehicle width direction).

First Exemplary Embodiment

Figure 1:
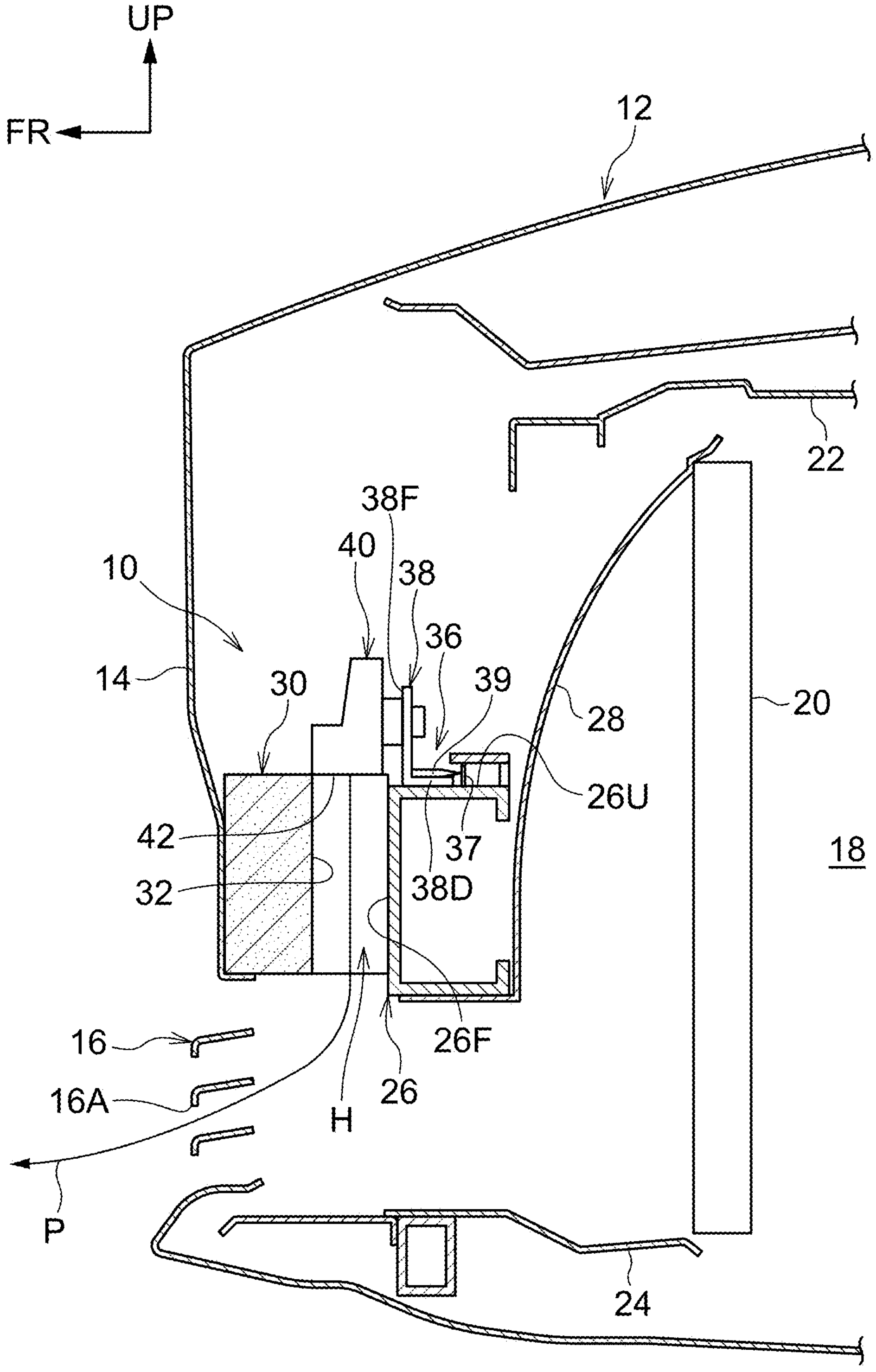
FIG. 1 is a schematic side view illustrating a vehicle front portion structure according to a first exemplary embodiment.

First, explanation follows regarding a first exemplary embodiment. As illustrated in FIG. 1, at a front end portion of a vehicle 12 to which a vehicle front portion structure 10 according to the first exemplary embodiment has been applied, a bumper cover 14 that configures a design at a front end portion thereof is provided. A lower grille 16 is provided at a lower portion of the bumper cover 14 (a lower side of an absorber 30, which is described below, as seem in front view), and plural opening portions 16A, each having a longitudinal direction along the vehicle width direction, are formed side-by-side in the vertical direction in the lower grille 16.

A power unit room 18 is provided at a rear side of the bumper cover 14, and a drive device, such as an engine or a motor, not illustrated in the drawings, is installed at an interior of the power unit room 18. A radiator 20 is provided at a front side of the drive device. A radiator support upper 22 is provided at an upper side of the radiator 20, and a radiator support lower 24 is provided at a lower side of the radiator 20. The radiator 20 is fixed by the radiator support upper 22 and the radiator support lower 24.

A left and right pair of front side members, not illustrated in the drawings, respectively extend along the front-rear direction at vehicle width direction outer sides of the power unit room 18. A bumper reinforcement 26, which substantially extends along the vehicle width direction, bridges between front end portions of the left and right pair of front side members disposed at a front side of the vehicle 12.

The radiator 20 is disposed at a rear side of the bumper reinforcement 26, and a duct 28 is provided between the radiator 20 and the bumper reinforcement 26. Outside air introduced from the lower grille 16 flows into the power unit room 18 through the duct 28, and cools the drive device.

An absorber 30 is provided between the bumper cover 14 and the bumper reinforcement 26 (at a front side of the bumper reinforcement 26 at the rear side of the bumper cover 14). The absorber 30 is configured so as to be capable of absorbing energy of a collision load that is input from a front side, during a frontal collision or the like of the vehicle 12. Specifically, the absorber 30 is configured by, for example, a foam such as polypropylene. It should be noted that it is sufficient that the absorber 30 is configured by a material having a high impact absorption property, and there is no particular limitation on the material.

Figure 2:
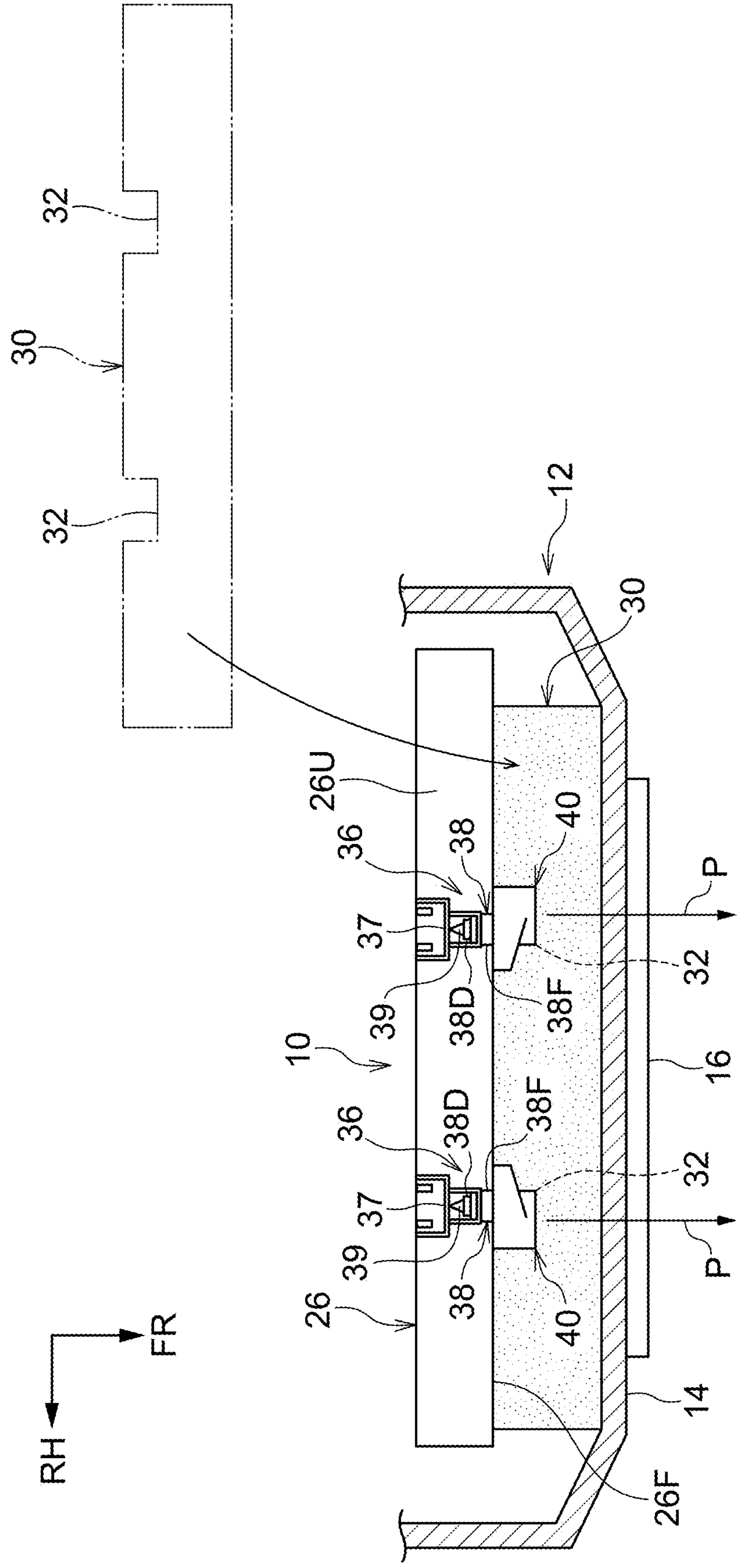
FIG. 2 is a schematic plan view illustrating a vehicle front portion structure according to a first exemplary embodiment.

As illustrated in FIG. 1 and FIG. 2, the absorber 30 is formed in a substantially prism (or rectangular column) shape having a longitudinal direction along the vehicle width direction. A dimension in the vertical direction of the absorber 30 is set in accordance with a dimension of the bumper reinforcement 26, and is the same as or slightly shorter than the bumper reinforcement 26, taking manufacturing dimensional tolerances into consideration. Further, a dimension in the vehicle width direction of the absorber 30 is set within a range of lengths in the vehicle width direction of a front end portion of the bumper cover 14 that is disposed substantially parallel to the bumper reinforcement 26, and the dimension in the vehicle width direction of the absorber 30 illustrated in the drawings is substantially the same as the length thereof.

The absorber 30 includes a notch portion 32 that forms, together with a front wall 26F of the bumper reinforcement 26, a through hole H that penetrates in the vertical direction. Namely, the notch portion 32 is formed in a substantially U-shaped shape, as seen in plan view, with the open side of the notch portion 32 facing a rear side, and plural (two as illustrated in the drawings) notch portions 32 are separated from each other by a predetermined distance in the vehicle width direction. It should be noted that a depth (a length along the front-rear direction) of each notch portion 32 is, for example, approximately ⅓ of a thickness along the front-rear direction of the absorber 30, to the extent that the function as the absorber 30 is not impaired.

A horn 40 is supported at an upper wall 26U of the bumper reinforcement 26 via a support mechanism 36 that enables movement toward the rear side. Support mechanisms 36 and horns 40 are respectively provided at each through hole H, and are disposed such that a resonance portion 42 at a distal end of the horn 40 faces the through hole H from an upper side. Namely, each horn 40 is disposed with the resonance portion 42 facing a lower side, and generates sound toward an interior of each through hole H.

Sound generated toward the interior of each through hole H is transmitted toward the front side through the opening portions 16A of the lower grille 16. It should be noted that in FIG. 1 and FIG. 2, the transmission path of sound generated from each horn 40 is indicated by the arrow P. Further, although the horns 40 illustrated in the drawings are disposed so as to be bilaterally symmetrical, there is no limitation thereto.

The support mechanism 36 includes a slide member 38 that is substantially L-shaped, as seen in side view, and that is configured so as to be capable of sliding toward the rear side, and a shield plate 37 that prevents movement of the slide member 38 toward the rear side at normal times, and the horn 40 is attached to a front wall 38F of the slide member 38. A needle-shaped member 39 that has a tapered shape at a rear side is provided at an upper face of a lower wall 38D of the slide member 38, and the shield plate 37 is disposed facing a rear end portion, which has a tapered shape, of the needle-shaped member 39.

Figure 3A:
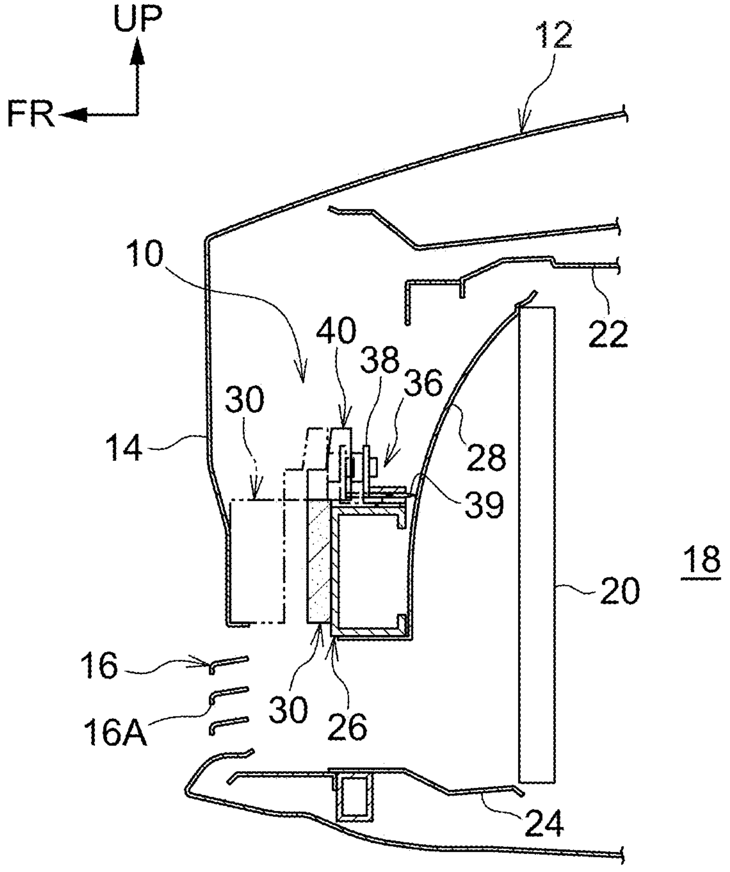
FIG. 3A is a schematic side view illustrating a state of a horn during a frontal collision of a vehicle front portion structure according to a first exemplary embodiment.
Figure 3B:
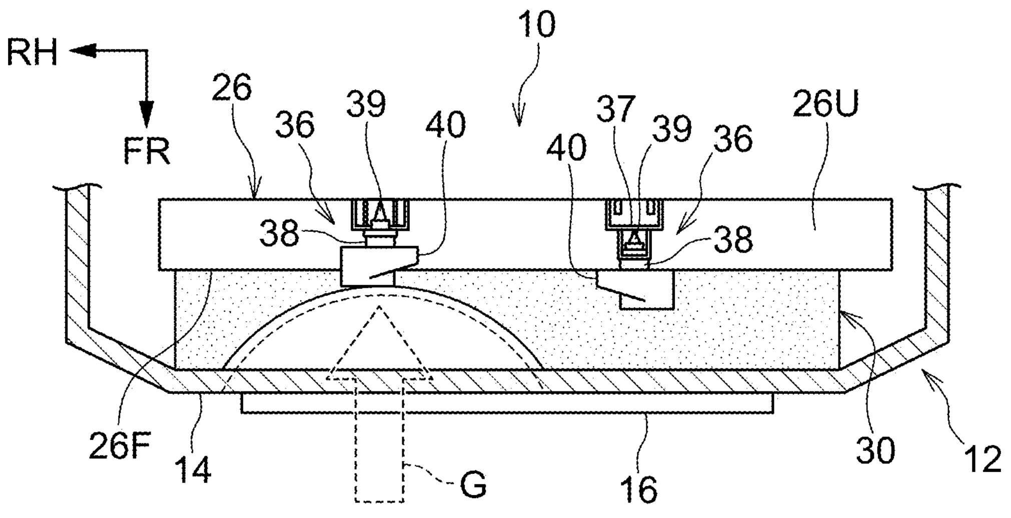
FIG. 3B is a schematic plan view illustrating a state of a horn during a frontal collision of a vehicle front portion structure according to a first exemplary embodiment.

Therefore, as illustrated in FIG. 3A and FIG. 3B, a configuration is such that when a load (indicated by the arrow G in FIG. 3B) is input to the horn 40 from the front side during a frontal collision or the like of the vehicle 12, the rear end portion, which has a tapered shape, of the needle-shaped member 39 pierces the shield plate 37, and the horn 40 is capable of moving to the rear side together with the slide member 38.

Explanation follows regarding operation of the vehicle front portion structure 10 according to the first exemplary embodiment configured as described above.

As described above, the absorber 30 that is provided at the front side of the bumper reinforcement 26 includes the notch portions 32 that form, together with the front wall 26F of the bumper reinforcement 26, the through holes H that penetrate in the vertical direction. The lower grille 16 is provided at the bumper cover 14 at the lower side of the absorber 30, as seen in front view, and the horn 40 that is supported at the upper wall 26U of the bumper reinforcement 26 is disposed such that the resonance portion 42 faces the through hole H from the upper side.

Namely, sound generated from the horn 40 is transmitted toward the front side from the lower grille 16 through the through-hole H. This enables a sound pressure drop of sound generated from the horn 40 to be suppressed, particularly in a case in which the vehicle 12 is not provided with an upper grille. In addition, plural (two) notch portions 32, each forming a through hole H, are separated from each other in the vehicle width direction, and horns 40 are respectively provided at each through hole H, such that a sound pressure drop of sound transmitted from the lower grille 16 toward the front side can be more effectively suppressed than in a case in which only a single horn 40 is provided.

The horn 40 is supported at the upper wall 26U of the bumper reinforcement 26, and is disposed further toward the upper side than the lower grille 16. Namely, a distance between the horn 40 and a road surface can be increased. Therefore, there is no risk of the horn 40 failing due to road surface interference, entry of foreign matter such as muddy water, or the like. Namely, the first exemplary embodiment enables an occurrence of a failure in the horn 40 to be suppressed, and enables the reliability of the horn 40 to be improved.

The horn 40 is supported at the upper wall 26U of the bumper reinforcement 26 so as to be capable of moving toward the rear side when a load is input from the front side. Specifically, the shield plate 37, which prevents movement of the horn 40 toward the rear side at normal times, is provided at the upper wall 26U of the bumper reinforcement 26, and the needle-shaped member 39 that faces the shield plate 37 is provided at the slide member 38 to which the horn 40 is attached.

Therefore, in a frontal collision of the vehicle 12, when a load is input from the front side, as illustrated in FIG. 3A and FIG. 3B, the needle-shaped member 39 that is provided at the slide member 38 pierces the shield plate 37, and the horn 40 moves toward the rear side together with the slide member 38. As a result, energy absorption by the absorber 30 (i.e., deformation of the absorber 30) is not likely to be hindered by the horn 40 during a frontal collision of the vehicle 12. Further, moving the horn 40 toward the rear side can be realized by such a simple configuration, thereby enabling an increase in manufacturing costs to be suppressed.

Second Exemplary Embodiment

Explanation follows regarding a second exemplary embodiment. It should be noted that portions that are similar to those in the first exemplary embodiment are appended with the same reference numerals, and detailed explanation (including common operation) is appropriately omitted.

Figure 4:
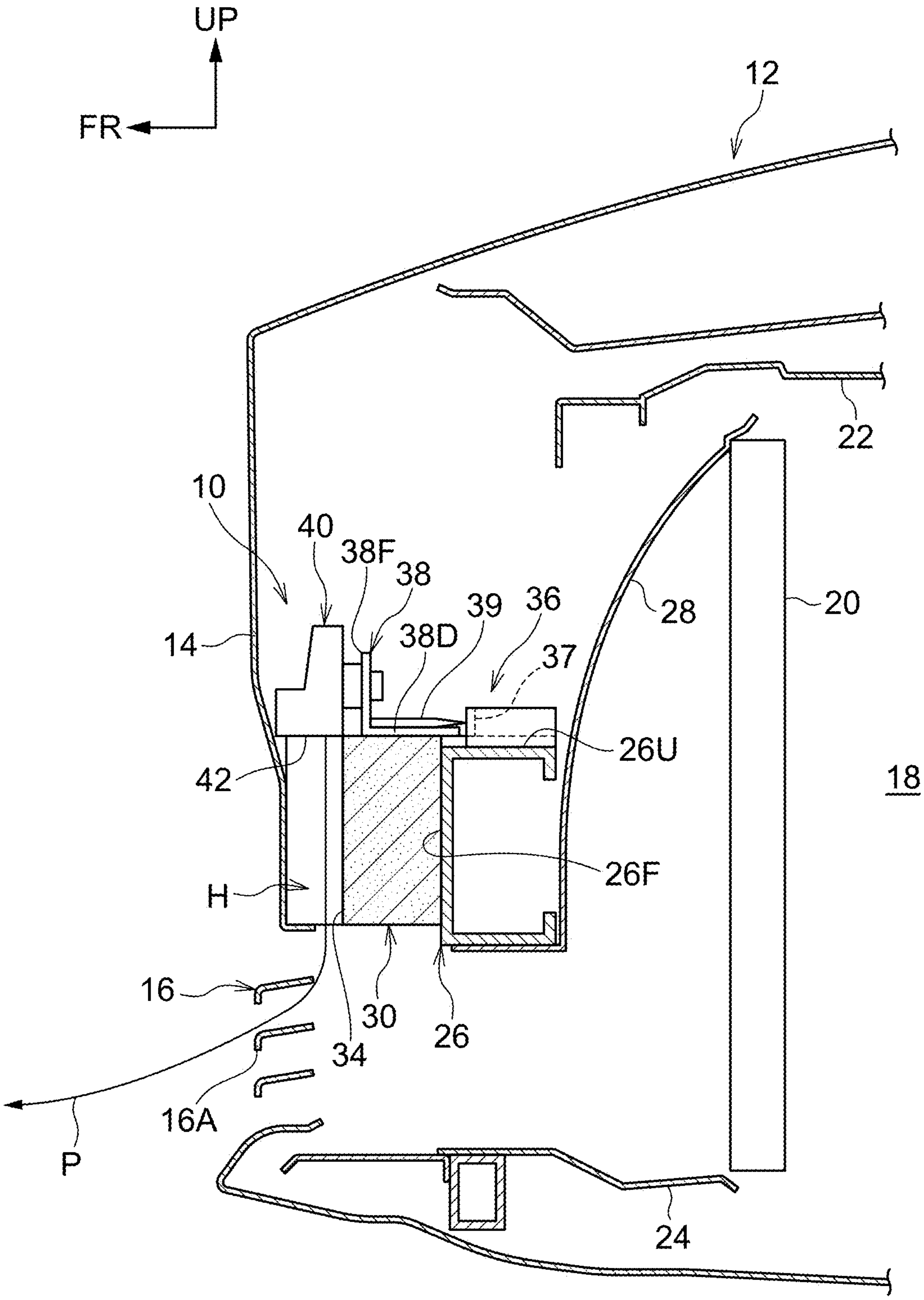
FIG. 4 is a schematic side view illustrating a vehicle front portion structure according to a second exemplary embodiment.
Figure 5:
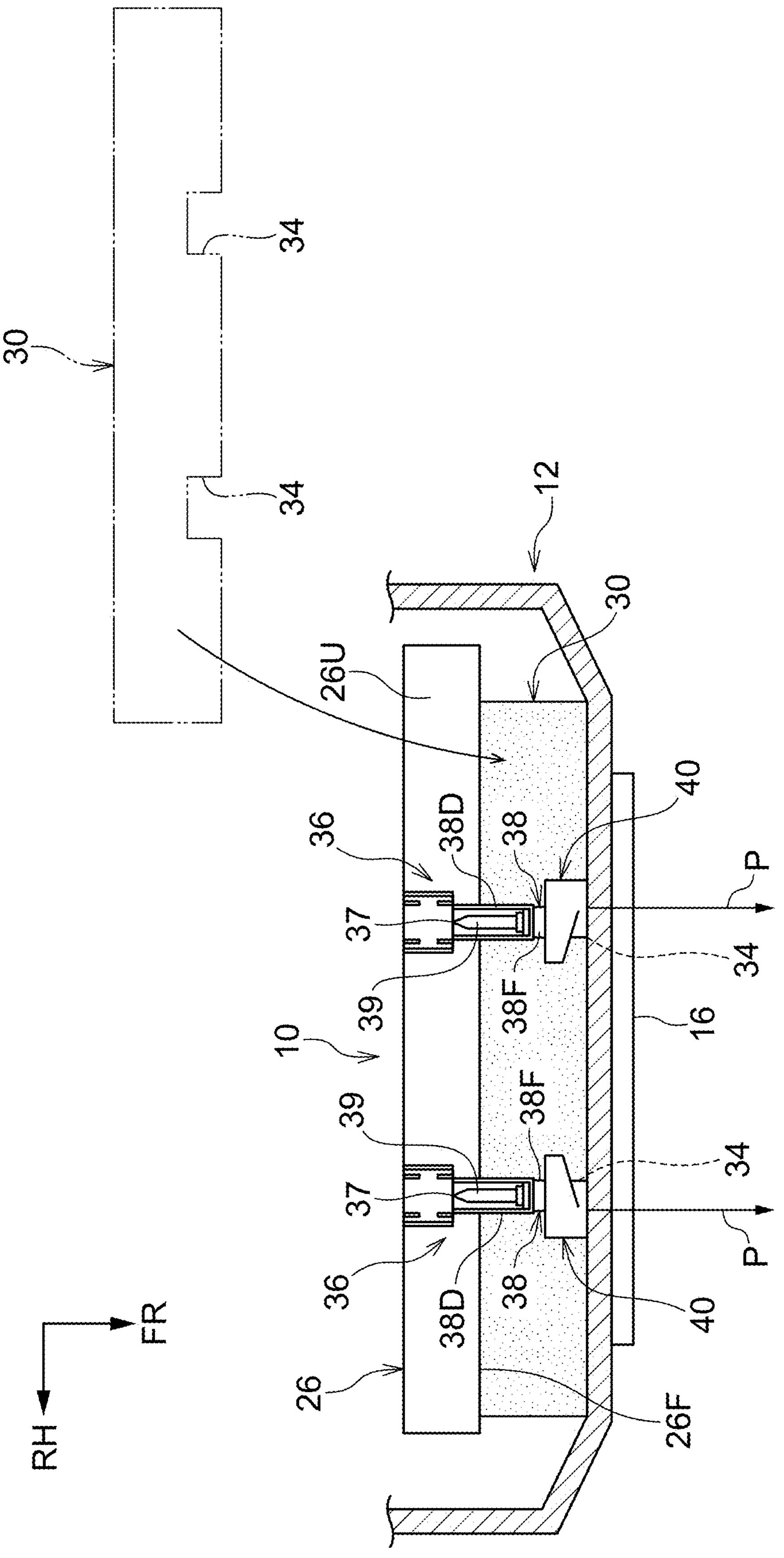
FIG. 5 is a schematic plan view illustrating a vehicle front portion structure according to a second exemplary embodiment.

As illustrated in FIG. 4 and FIG. 5, the second exemplary embodiment is different from the above-described first exemplary embodiment only in that the absorber 30 includes the notch portions 34 that form, together with the bumper cover 14, the through holes H that penetrate in the vertical direction, and in that the slide member 38 is provided so as to jut out a predetermined length toward an upper face side (front side) of the absorber 30.

Namely, the notch portion 34 is formed in a substantially U-shaped shape, as seen in plan view, with the open side of the notch portion 34 facing the front side, and plural (two as illustrated in the drawings) notch portions 34 are separated from each other by a predetermined distance in the vehicle width direction. It should be noted that the depth of the notch portions 34 is the same as the depth of the notch portions 32 in the first exemplary embodiment. Further, each horn 40 provided at each through hole H is disposed such that the slide member 38 juts out a predetermined length toward the upper face side of the absorber 30 such that the resonance portion 42 at the distal end of the horn 40 faces the respective through hole H from the upper side.

Namely, each horn 40 is disposed with the resonance portion 42 facing the lower side, and generates sound toward the interior of each through hole H. Sound generated toward the interior of each through hole H is transmitted toward the front side through the opening portions 16A of the lower grille 16. This enables a sound pressure drop of sound generated from the horn 40 to be suppressed, particularly in a case in which the vehicle 12 is not provided with an upper grille.

The horn 40 is supported at the upper wall 26U of the bumper reinforcement 26, and is disposed further toward the upper side than the lower grille 16. Therefore, there is no risk of the horn 40 failing due to road surface interference, entry of foreign matter such as muddy water, or the like. Namely, the second exemplary embodiment enables an occurrence of a failure in the horn 40 to be suppressed, and enables the reliability of the horn 40 to be improved.

The horn 40 is supported at the upper wall 26U of the bumper reinforcement 26 so as to be capable of moving toward the rear side when a load is input from the front side.

Specifically, the shield plate 37, which prevents movement of the horn 40 toward the rear side at normal times, is provided at the upper wall 26U of the bumper reinforcement 26, and the needle-shaped member 39 that faces the shield plate 37 is provided at the slide member 38 to which the horn 40 is attached.

Figure 6A:
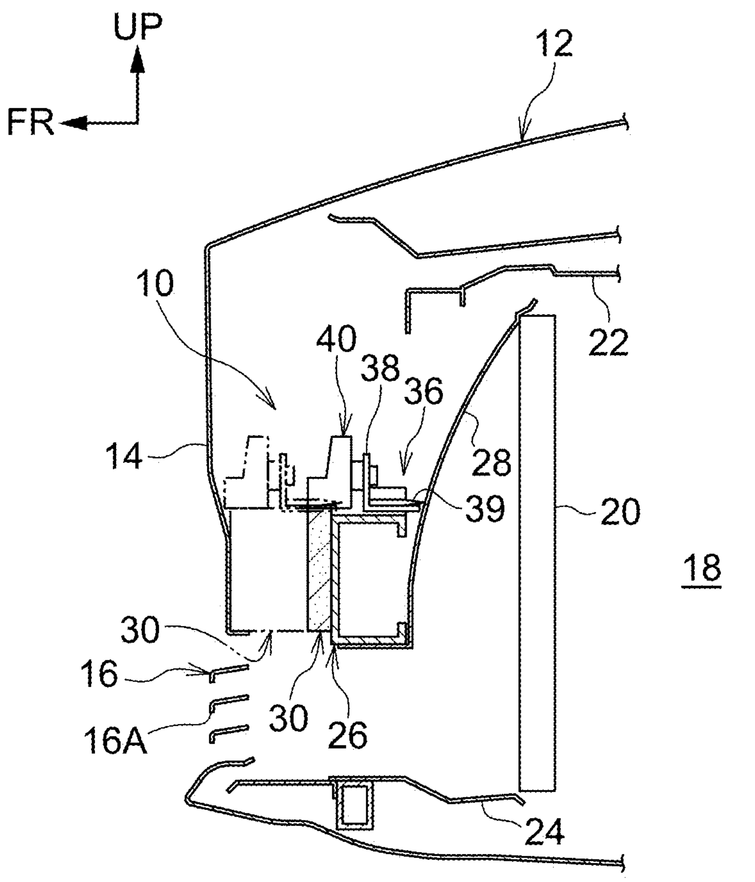
FIG. 6A is a schematic side view illustrating a state of a horn during a frontal collision of a vehicle front portion structure according to a second exemplary embodiment.
Figure 6B:
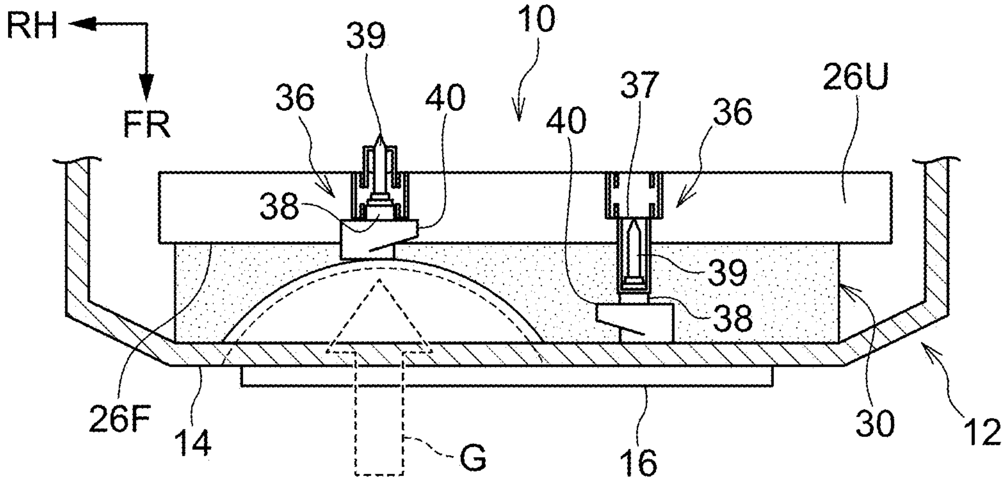
FIG. 6B is a schematic plan view illustrating a state of a horn during a frontal collision of a vehicle front portion structure according to a second exemplary embodiment.

Therefore, in a frontal collision of the vehicle 12, when a load is input from the front side, as illustrated in FIG. 6A and FIG. 6B, the needle-shaped member 39 that is provided at the slide member 38 pierces the shield plate 37, and the horn 40 moves toward the rear side together with the slide member 38. Thus, energy absorption by the absorber 30 (deformation of the absorber 30) is not likely to be hindered by the horn 40 during a frontal collision of the vehicle 12.

Although the vehicle front portion structure 10 according to the present exemplary embodiments has been explained above based on the drawings, the vehicle front portion structure 10 according to the present exemplary embodiments is not limited to those illustrated in the drawings, and may be appropriately modified in design without departing from the gist of the present disclosure.

For example, the support mechanism 36 that supports the horn 40 so as to be capable of moving toward the rear side is not limited to the configuration illustrated in the drawings. Although not illustrated in the drawings, as the support mechanism 36, a configuration may be such that a weak portion, a hinge portion, or the like is provided at a member to which the horn 40 is attached, such that the horn 40 can move (retract) toward the rear side when a load is input from the front side.

What is claimed is:

1. A vehicle front portion structure, comprising:

a bumper reinforcement that extends substantially in a vehicle width direction at a front portion of a vehicle;

an absorber that is provided at a vehicle front side of the bumper reinforcement, and that includes a notch portion forming, together with a front wall of the bumper reinforcement, a through hole that penetrates in a vehicle vertical direction;

a lower grille that is provided at a bumper cover at a vehicle lower side of the absorber, as seen in front view; and a horn that is supported at an upper wall of the bumper reinforcement, and that is disposed such that a resonance portion faces the through hole from a vehicle upper side.

2. The vehicle front portion structure according to claim 1, wherein:

the horn is supported at the upper wall of the bumper reinforcement so as to be movable toward a vehicle rear side when a load is input from the vehicle front side.

3. The vehicle front portion structure according to claim 2, wherein:

the bumper reinforcement comprises a shield plate, which prevents movement of the horn toward the vehicle rear side at normal times, at the upper wall thereof; and the horn is configured to pierce the shield plate when a load is input from the vehicle front side, and move toward the vehicle rear side.

4. The vehicle front portion structure according to claim 1, wherein:

the notch portion forming the through hole comprises a plurality of the notch portions that are separated from each other in the vehicle width direction; and the horn is provided at each of the through holes.

5. A vehicle front portion structure, comprising:

a bumper reinforcement that extends substantially in a vehicle width direction at a front portion of a vehicle;

an absorber that is provided at a vehicle front side of the bumper reinforcement, and that includes a notch portion forming, together with a bumper cover, a through hole that penetrates in a vehicle vertical direction;

a lower grille that is provided at the bumper cover at a vehicle lower side of the absorber, as seen in front view; and a horn that is supported at an upper wall of the bumper reinforcement, and that is disposed such that a resonance portion faces the through hole from a vehicle upper side.

6. The vehicle front portion structure according to claim 5, wherein:

the horn is supported at the upper wall of the bumper reinforcement so as to be movable toward a vehicle rear side when a load is input from the vehicle front side.

7. The vehicle front portion structure according to claim 6, wherein:

the bumper reinforcement comprises a shield plate, which prevents movement of the horn toward the vehicle rear side at normal times, at the upper wall thereof; and the horn is configured to pierce the shield plate when a load is input from the vehicle front side, and move toward the vehicle rear side.

8. The vehicle front portion structure according to claim 5, wherein:

the notch portion forming the through hole comprises a plurality of the notch portions that are separated from each other in the vehicle width direction; and the horn is provided at each of the through holes.

* * * * *